United States Patent [19]
Chan

[11] Patent Number: 5,737,135
[45] Date of Patent: Apr. 7, 1998

[54] OPTO-MECHANICAL APPARATUS FOR MOVING AND SCANNING IN AN OPTICAL SYSTEM

[75] Inventor: Chien-Chin Chan, Hsin-Chu Hsien, Taiwan

[73] Assignee: Umax Data Systems Inc., Hsinchu, Taiwan

[21] Appl. No.: 769,066

[22] Filed: Dec. 18, 1996

[51] Int. Cl.[6] .................................................. G02B 7/02
[52] U.S. Cl. ............................ 359/822; 359/823; 359/818; 359/829
[58] Field of Search ................................ 359/822, 823, 359/818, 829

[56] References Cited

U.S. PATENT DOCUMENTS

| | | | |
|---|---|---|---|
| 5,381,264 | 1/1995 | Wickholm et al. | 359/829 |
| 5,594,589 | 1/1997 | Chon | 359/829 |

*Primary Examiner*—Frank G. Font
*Assistant Examiner*—Reginald A. Ratliff

[57] ABSTRACT

An opto-mechanical apparatus for moving and scanning in an optical system comprises a step motor, a timing belt, a first lead screw carrying a first optical assembly, and a second lead screw carrying a second optical assembly. Each of the lead screws has a spiral thread forming a lead path. The lead path of the second lead screw is twice as long as the lead path of the first lead screw. Each lead screw has a gear fastened to its one end. The timing belt connects the rotation axis of the step motor and the two gears on the lead screws. When the step motor rotates, the two gears are driven by the timing belt. The two lead screws are also rotated by the gears. The first optical assembly moves twice as fast as the second optical assembly because the two gears have identical radii but the second lead path is twice long. The different distances traveled by the two optical assemblies ensure that the optical system has a constant optical resolution while scanning.

10 Claims, 7 Drawing Sheets

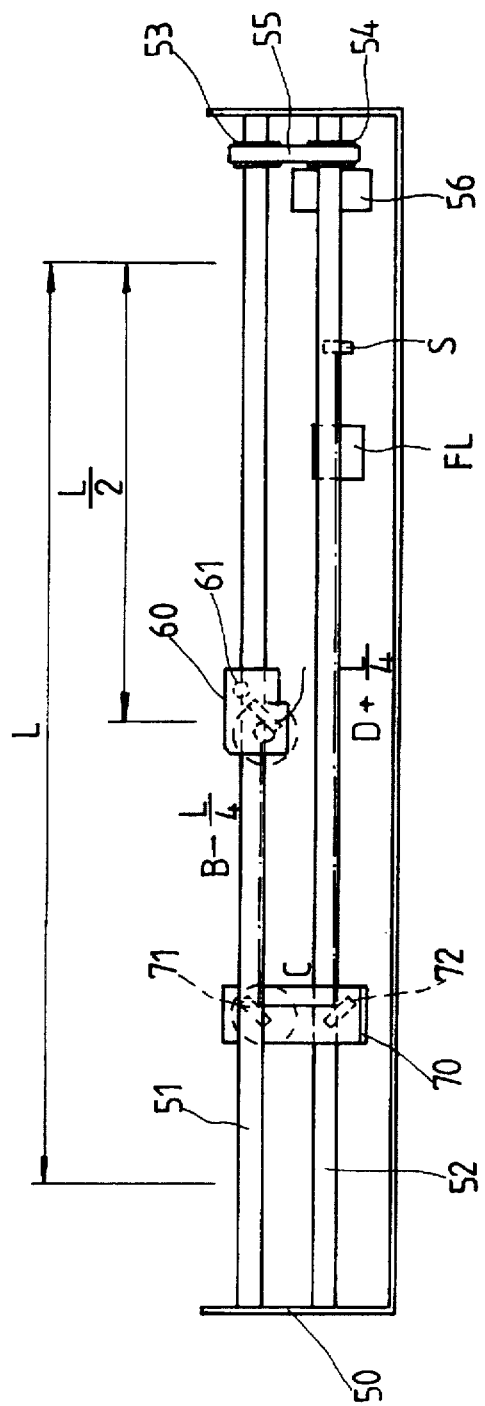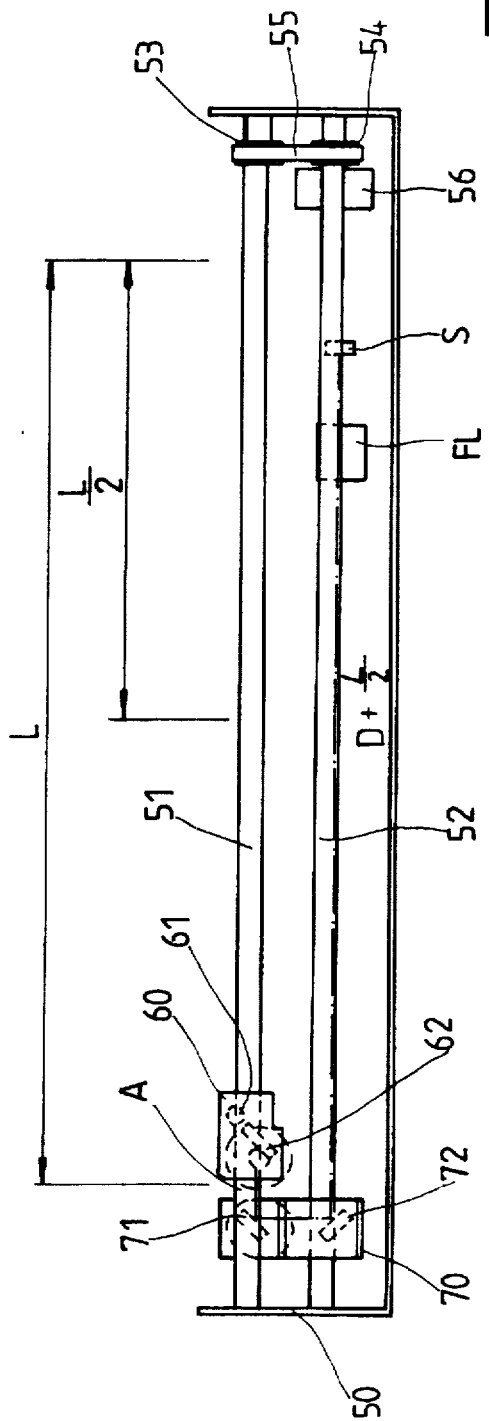

OPTO-MECHANICAL APPARATUS FOR MOVING AND SCANNING IN AN OPTICAL SYSTEM

FIELD OF THE INVENTION

The present invention relates to an apparatus for moving and scanning in an optical system, more specifically to an opto-mechanical apparatus that moves and scans optical assemblies in order to maintain constant optical resolution along the whole scanning path.

BACKGROUND OF THE INVENTION

In an optical system, an opto-mechanical setup is often required to move optical assemblies and perform the scanning function for the system. Conventionally, the opto-mechanical setup consists of motors, pulleys, steel wires and other mechanical parts to move optical components in order to scan. FIGS. 1 and 2 show an example of such a conventional opto-mechanical setup that moves and scans in an optical system.

The top view and the embodiment of the conventional setup can be seen from FIG. 1. It comprises a motor 10, a plurality of pulleys, a first optical assembly 30 and a second optical assembly 40. When the motor 10 rotates, two speed reduction gears 11, 12 are also rotated. The gear 12 has its periphery tangent to the periphery of a pulley 20 for coupling the rotation to the pulley. The motion of the pulley 20 is further coupled to pulleys 21, 22, 23 and 24 by means of a steel wire 26. As shown in FIG. 1, the wire 26 is wired around the pulleys 20–24 in such a way that the motor 10 can drive the pulleys through the wire 26 for achieving complex dragging motion. In addition, different sizes of the pulleys, the angles between the central axes of the pulleys, and the sophisticated way of wiring around the pulleys make it possible that different segments of the wire can move with two different speeds. Within a given period of time, the wire segment moving with a higher speed travels twice as long as the wire segment moving with a lower speed.

As can be seen from the cross-sectional view shown in FIG. 2, the first optical assembly 30 comprises a light source 31 and a first reflection mirror 32. The second optical assembly consists of a second reflection mirror 41 and a third reflection mirror 42. One or both ends of the two optical assemblies 30, 40 have leading holes on them. Leading rod mounted horizontally on the chassis of the system pass through these leading holes. Therefore, the optical assemblies 30, 40 can move back and forth horizontally along the leading rods. The two sides of the first optical assembly 30 are clamped on the segment of the wire 26 that can move with a higher speed. A circular rod 43 passes through the second optical assembly 40. The pulleys 44, 45 are fastened to the two ends of the circular rod 43. The segment of the wire 26 that winds around the two pulleys 44, 45 moves with a lower speed. The second optical assembly 40 travels by means of the dragging caused by the rotation of the pulleys 44, 45 and the circular rod 43. During a given period of time, the second optical assembly 40 moves horizontally only half of the distance that the first optical assembly 30 moves.

When the optical assemblies move, the image scanned by the light source 31 is reflected from the first reflection mirror 32 to the second reflection mirror 41 and the third reflection mirror 42. The scanned image signal is collected by a focusing lens FL and detected by an imaging sensor S. Because the first optical assembly 30 has twice the horizontal moving distance compared to the second optical assembly 40, the light source 31 can scan an object and transmit the image signal to the imaging sensor S with an identical optical path at any scanning location. The image signal is scanned with a constant speed and identical optical resolution.

The conventional moving and scanning apparatus for an optical system relies on a steel wire and a number of pulleys to drag and scan. It requires winding a wire around several pulleys of different sizes. The mounting angle of each pulley is different. The structure is so complicated that it is very difficult to assemble and adjust the apparatus. It is therefore hard to manufacture. In addition, a relatively long steel wire is necessary to connect and drag the components in the apparatus. The quality of the wire becomes very critical. An expensive high tension steel wire is often required to maintain the scanning quality of the optical system. The seven pulleys in the apparatus are located at different places. It takes a relatively high power motor to drive the large number of pulleys. The overall cost of the apparatus is very high.

SUMMARY OF THE INVENTION

The present invention has been made to overcome the above-mentioned drawback of a conventional moving and scanning apparatus in an optical system. In this invention, lead screws, a timing belt and a combination of gears form a moving apparatus that has a simple structure and is easy to adjust. The cost of the apparatus of the present invention is also greatly reduced.

According to the present invention, two lead screws are set up in such a way that the length of the lead path on one is twice of the lead path on the other. A gear is mounted on one end of each lead screw. The gears are connected by timing belts to the rotation axis of a step motor for coupling the motor rotation. According to the ratio of the two lead paths, two optical assemblies carried by the two lead screws are installed at appropriate locations on the lead screws. When the step motor rotates, the timing belt drives the gears and the lead screws. The two optical assemblies move along the lead screws. The ratio of the moving distances between the two optical assemblies is proportional to the ratio of the lead paths of the two lead screws. The image scanned by the optical system can, therefore, maintain stable and constant optical resolution.

The apparatus of the present invention can also be accomplished by using two lead screws having identical lead paths. Gears having different radii or different numbers of cogs are mounted on the two lead screws. When the step motor rotates, the timing belt drives the gears. Because of the ratio of the radii or the numbers of cogs, the two lead screws also rotate with different speeds according to the above ratio. Consequently, the optical assemblies carried by the lead screws also move proportionally. By making one optical assembly move twice the distance of the other optical assembly, the optical system can scan an object and obtain its image with constant optical resolution.

BRIEF DESCRIPTION OF THE DRAWINGS

FIGS. 5A–C illustrate the cross-sectional views of the apparatus of FIG. 3 and the relative positions of the first and second optical assemblies when the first optical assembly is at the beginning (A), the midpoint (B) and the end (C) of a scan.

DETAILED DESCRIPTION OF THE PREFERRED EMBODIMENTS

Figure 1:
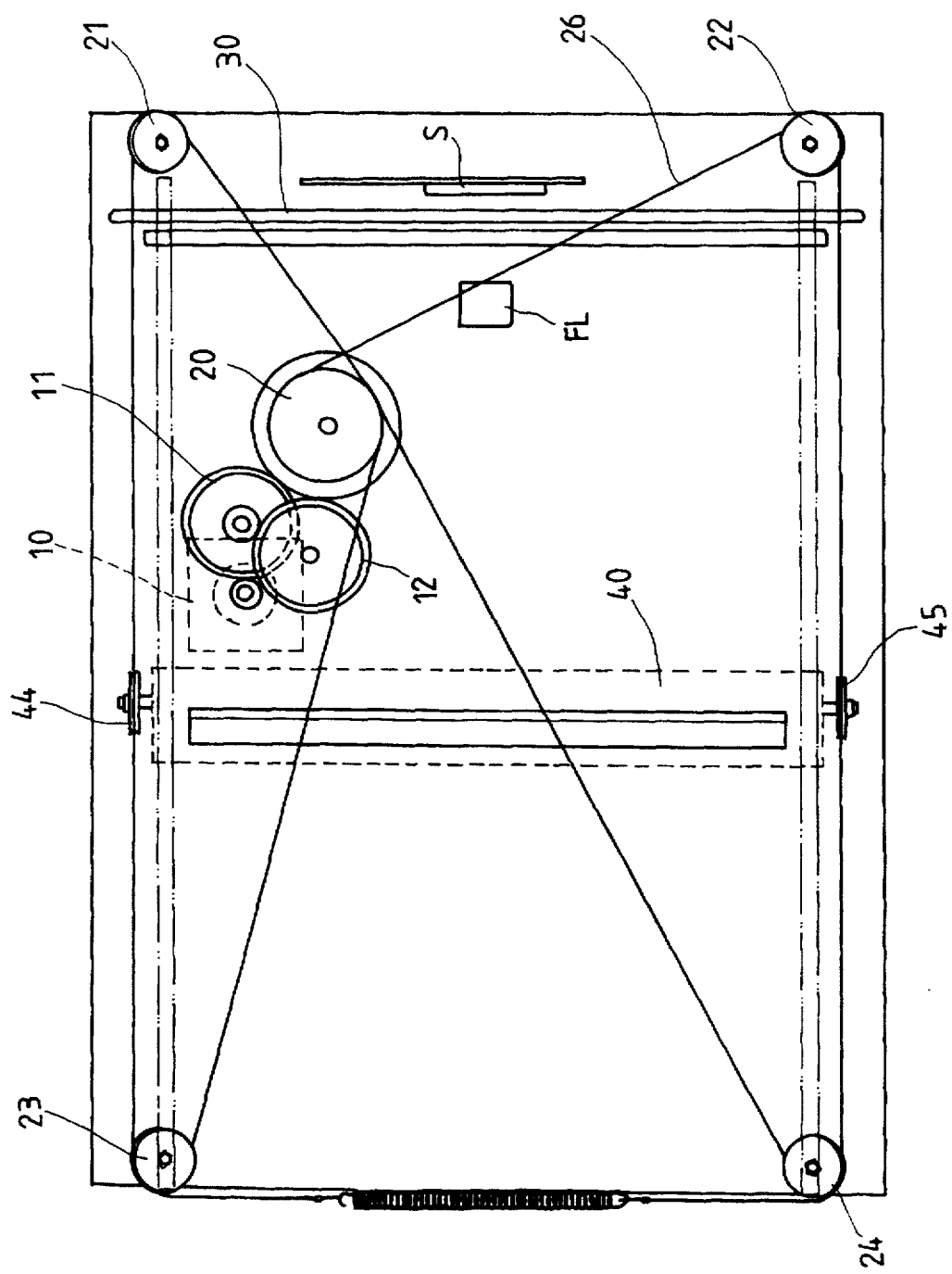
FIG. 1 shows the structure of a conventional opto-mechanical setup comprising a dragging wire and a number of pulleys for moving and scanning in an optical system.
Figure 2:
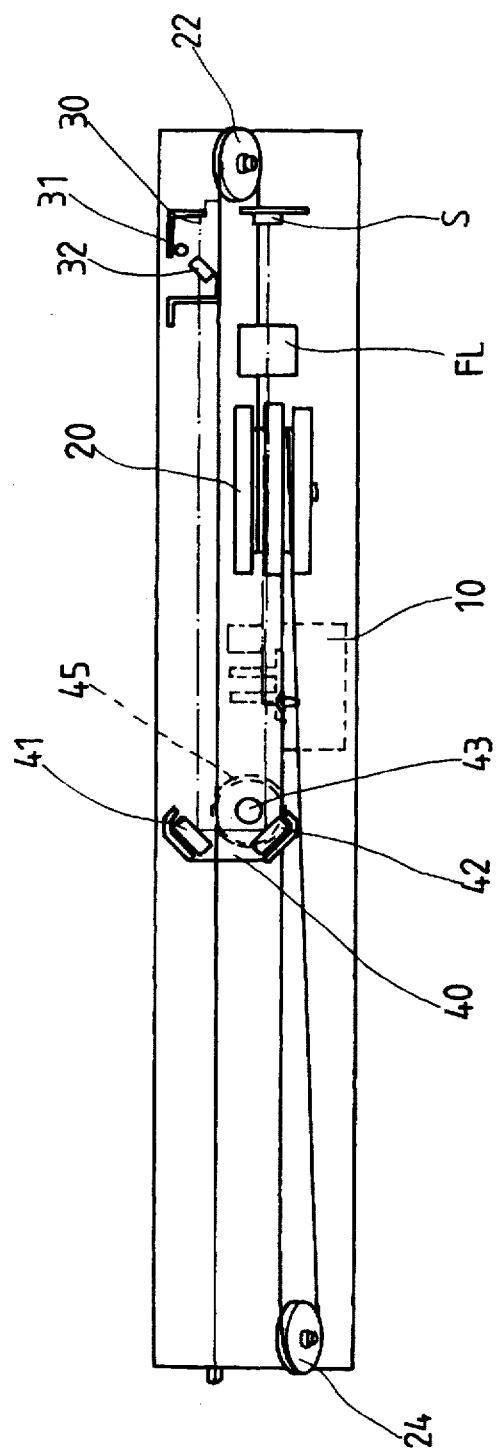
FIG. 2 shows a cross-sectional view of the setup shown in FIG. 1.
Figure 3:
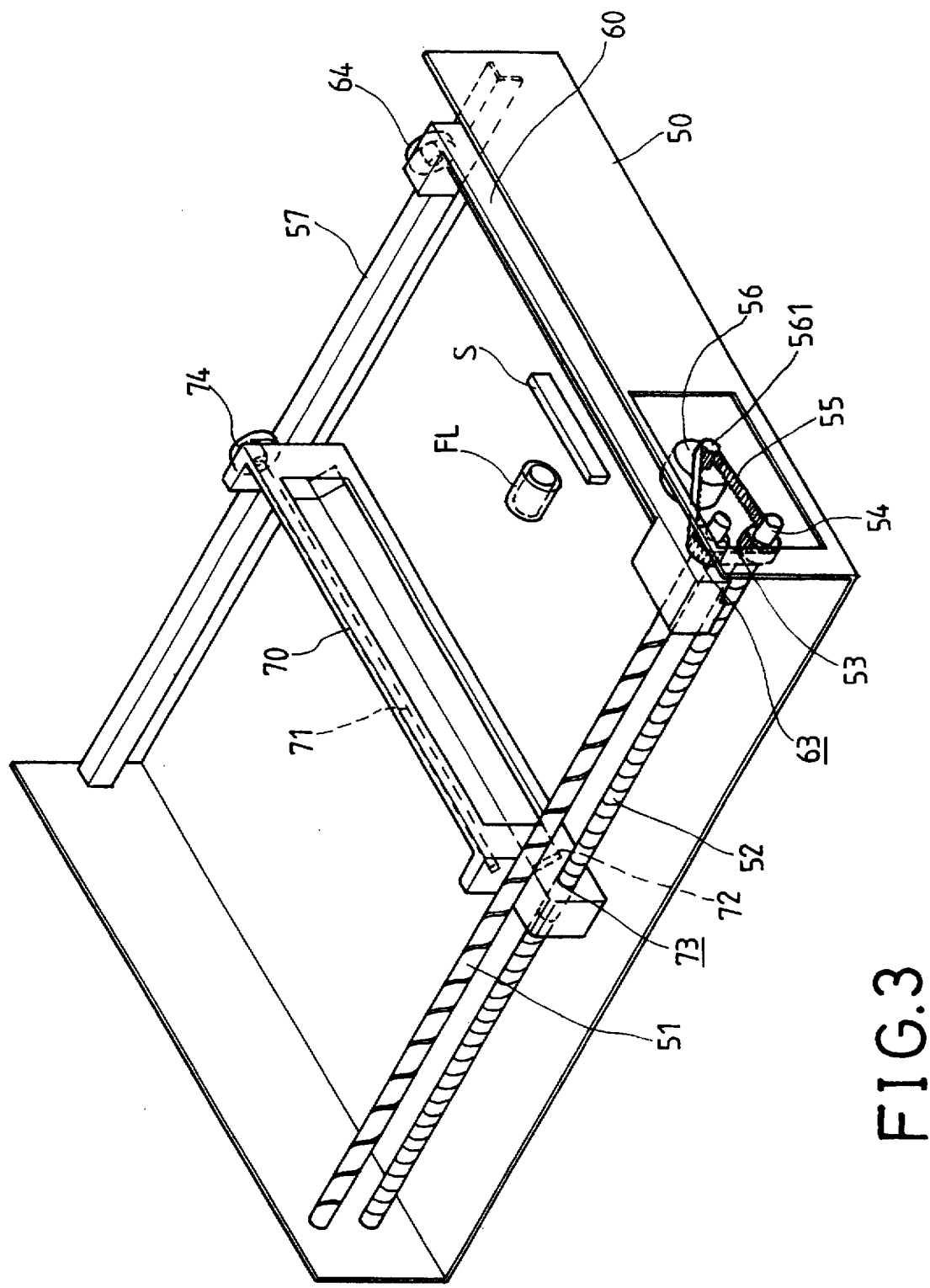
FIG. 3 shows a three-dimensional view of the structure of the opto-mechanical apparatus of the present invention for moving and scanning in an optical system.
Figure 4:
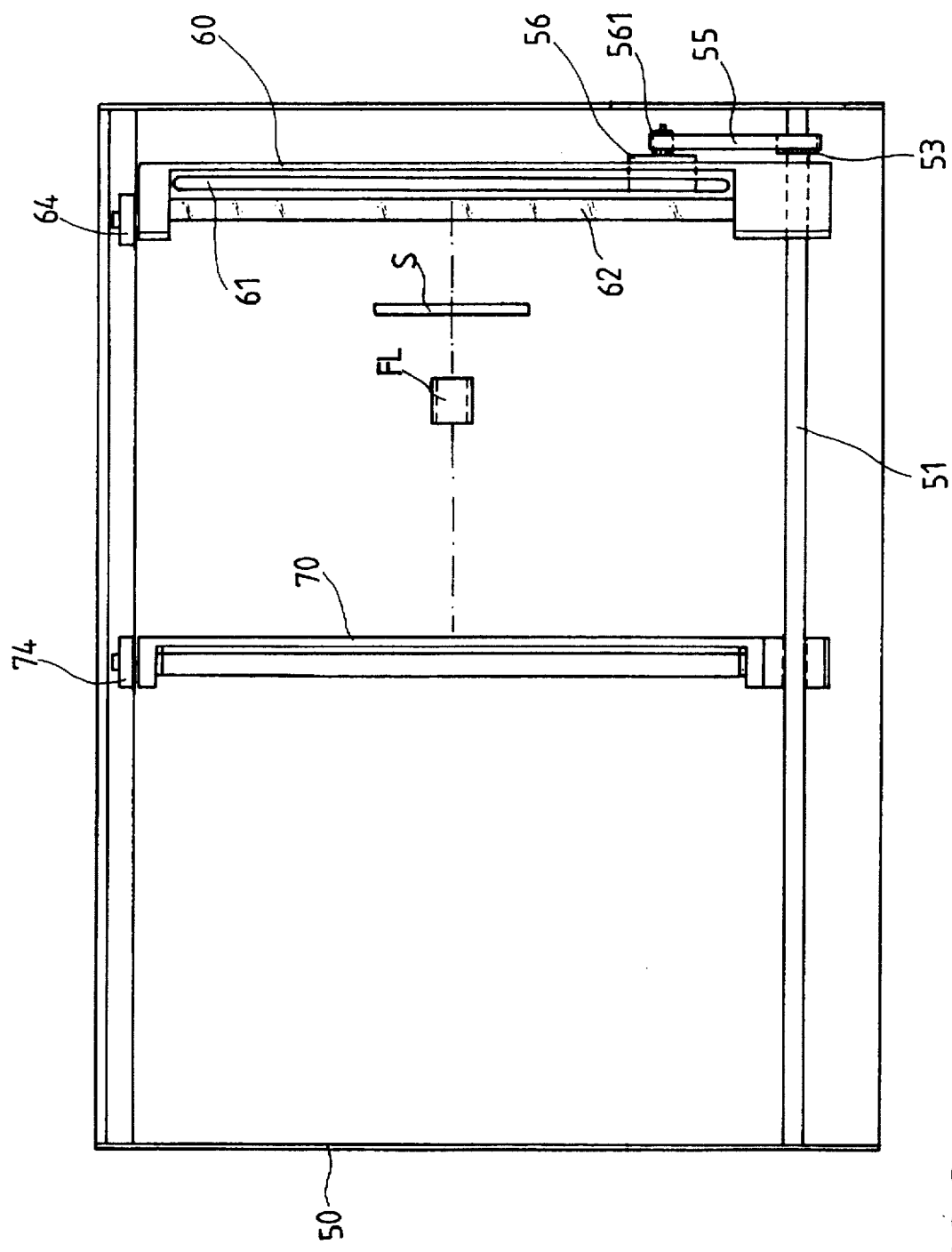
FIG. 4 illustrates the top view of the apparatus of the present invention as shown in FIG. 3.

With reference to FIG. 3, the preferred embodiment of the opto-mechanical apparatus of this invention comprises a first lead screw 51, a second lead screw 52, a first gear 53, a second gear 54, a time belt 55 and a step motor 56. As shown in FIG. 3, the optical system of this invention has a chassis 50. The first and second lead screws are mounted near one side of the chassis 50 as illustrated in FIG. 3. Each lead screw has a spiral thread forming a lead path. The lead path of the second lead screw 52 is twice as long as the lead path of the first lead screw 51. A lead track 57 is formed in parallel with the lead screws near the other side of the chassis 50. The first gear 53 is fastened on one end of the first lead screw 51. Similarly, the second gear 54 is fastened on the second lead screw 52. The timing belt 55 connects the rotation axis 561 of the step motor 56 and the two gears 53, 54. A plurality of cogs are formed on the inner surface of the timing belt 55 to match the cogs on the gears. The outer surface of the step motor axis also has matching cogs. The rotation of the step motor 56 drives the gears 53, 54 by means of the coupling through the timing belt 55. The lead screws 51, 52 also rotate correspondingly. As can be seen from FIG. 3 and the top view of the optical system shown in FIG. 4, the system has a first optical assembly 60 that includes a light source 61, a first reflection mirror 62, and a first wheel 64. The first optical assembly also comprises a first lead hole 63 formed near one end of the assembly as illustrated in FIG. 3. By letting the first screw 51 pass through the first lead hole 63, the first optical assembly 60 is supported by the first lead screw 51 on one end. The first wheel 64 is mounted on the opposite end of the first optical assembly 60. The wheel 64 is positioned on the lead track 57 formed on the chassis 50 so that it is allowed to move along the track. A spiral thread matched with that of the first lead screw 51 is formed on the inner surface of the first lead hole 63. When the first lead screw 51 rotates, the first optical assembly 60 is moved along the lead screw smoothly. With reference to both FIGS. 3 and 4, the optical system has a second optical assembly 70 comprising a second reflection mirror 71, a third reflection mirror 72, a second lead hole 73, and a second wheel 74. The second lead hole 73 is formed near one end of the second optical assembly 70 and the second wheel 74 is mounted on the opposite end. Similar to the way that the first optical assembly 70 is assembled, the second lead screw 52 passes through the second lead hole 73 and the second wheel 74 is positioned on the lead track 57. The inner surface of the second lead hole 73 also has a spiral thread matched to that of the second lead screw 52. Therefore, the second optical assembly 70 can move smoothly along the lead screw when the second lead screw 52 rotates. The light source 61 of the first optical assembly 60 transmits light to an object under scanning. The light reflected from the object forms an image of the object. The image is reflected by the first reflection mirror 62 and reaches the second reflection mirror 71. The second reflection mirror 71 further reflects the image to the third reflection mirror 72. The third reflection mirror 72 then relays the final image to a focusing lens FL that focuses the image to an imaging sensor S. The focusing lens FL and the imaging sensor S are conventional and their principles are not described here because they have been well known to persons skilled in the field.

Figure 5A:
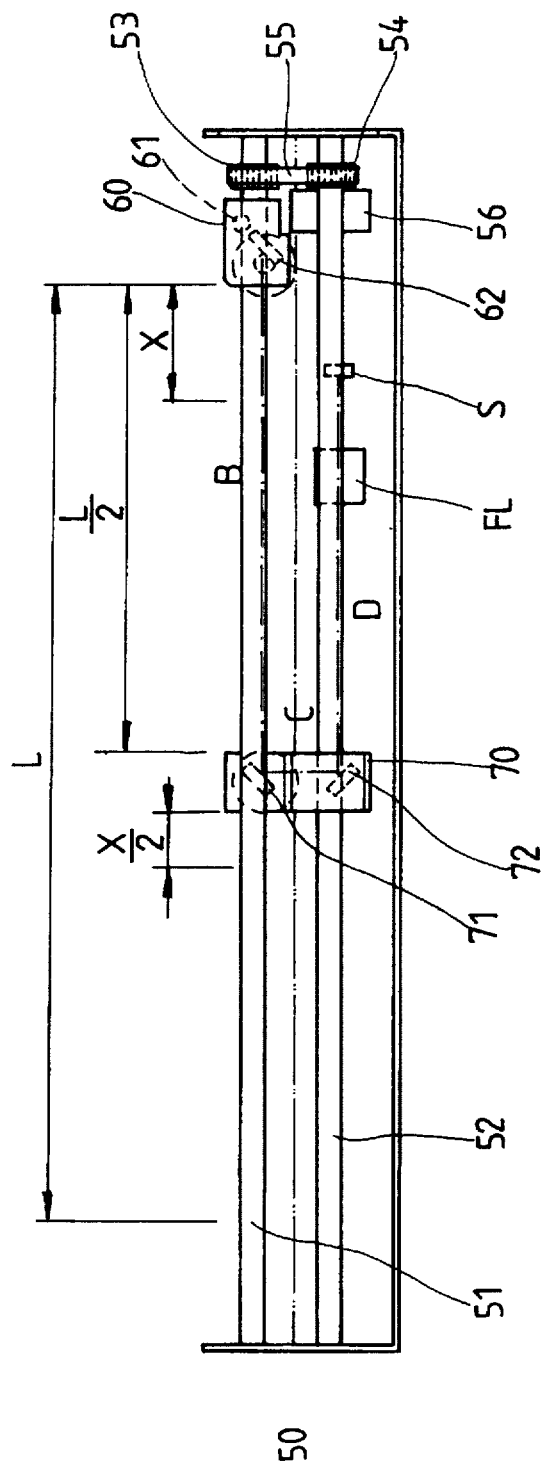

In order to maintain constant optical resolution while the object is scanned, it is necessary to ensure that the reflected light travels through an identical optical path in the optical system regardless of the scanning position. As shown in FIG. 5A, the distance between the beginning point and the end point of the scanning path is L. At any scanning point, the light source 61 transmits light to the object and the reflected light travels through the optical path formed by the first, second, and third mirrors 62, 71, 72 and the focusing lens FL. To achieve constant optical resolution, the total distance of the optical path needs to maintain constant.

As can be seen from FIG. 5A, the optical path A between the object to the first reflection mirror 62 is constant. The optical path C between the second reflection mirror 71 and the third reflection mirror 72 is also fixed. However, the optical path B between the first reflection mirror 62 and the second reflection mirror 71 is not fixed when the first and second optical assemblies are moved to scan. The optical path D between the third reflection mirror 72 and the focusing lens FL is not constant either.

If the first optical assembly 60 driven by the first lead screw 51 moves twice as fast as the second optical assembly 70 driven by the second lead screw 52, the second optical assembly travels a distance of X/2 when the first optical assembly travels a distance of X. The optical path between the first and second reflection mirrors becomes B−X+X/2. The optical path between the third reflection mirror 72 and the focus lens FL becomes D+X/2. The total optical path TT can be computed as $$TT = A + (B - X + X/2) + C + (D + X/2)$$
$$= A + B + C + D.$$

Therefore, the total optical path remains the same regardless where the scanning point is. The first and second lead screws 51, 52 of the present invention achieve the above speed relationship by means of the ratio in their lead paths. The lead path of the second lead screw 52 is twice as long as that of the first lead screw 51.

In order to ensure that the first optical assembly 60 can travel through the whole scanning distance L, the second optical assembly 70 has to be positioned in the mid-point of the scanning path when the first optical assembly 60 is at the beginning point as shown in FIG. 5A. The two optical assemblies can then reach the end point of the scanning path at the same time. FIG. 5B shows the relative positions of the two optical assemblies when the first optical assembly 60 reaches the mid-point of the scanning path in the optical system. As can be seen, the optical path between the first reflection mirror 62 and the second reflection mirror 71 is B−L/4. The optical path between the third reflection mirror 72 and the focusing lens FL is D+L/4. The total optical path becomes $$TT = A + (B - L/4) + C + (D + L/4)$$
$$= A + B + C + D.$$

FIG. 5C shows the relative positions of the two optical assemblies when the first optical assembly 60 reaches the end-point of the scanning path in the optical system. As can be seen, the optical path between the first reflection mirror 62 and the second reflection mirror 71 is B−L/2. The optical path between the third reflection mirror 72 and the focusing lens FL is D+L/2. The total optical path becomes $$TT = A + (B - L/2) + C + (D + L/2)$$
$$= A + B + C + D.$$

As shown above, the reflected light from the object always travels through an identical optical path A+B+C+D in the optical system regardless where the scanning point is. The invention can therefore satisfy the requirement of maintaining constant optical resolution in a scanning optical system.

Figure 6:
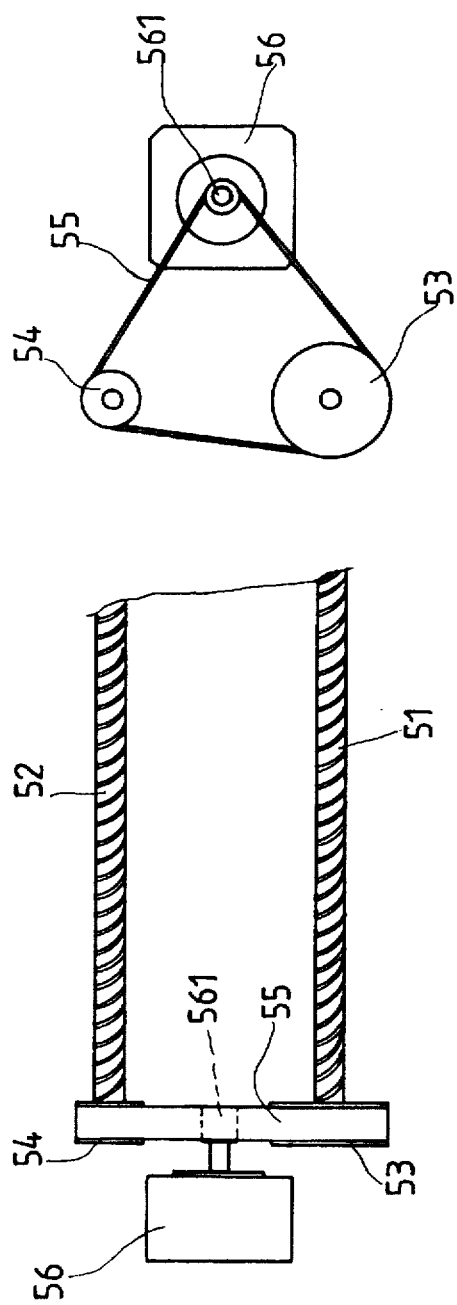
FIG. 6 shows the structure of an alternative embodiment of the present invention having two lead screws of identical lead paths.

As described above, the first optical assembly 60 has to move twice as fast as the second optical assembly 70 for satisfying the requirement of constant optical resolution. In addition to the embodiment using two lead screws having different lead paths as discussed earlier, the invention can also be accomplished by using two lead screws having identical lead paths. FIG. 6 shows the lead screws, gears and timing belt of the alternative embodiment of the invention.

With reference to FIG. 6, the two lead screws 51, 52 have identical lead paths. The radius and the number of cogs of the second gear 54 mounted on the second lead screw 52 are both twice as large as those of the first gear 53 mounted on the first lead screw 51. The timing belt 55 connects the rotation axis 561 of the step motor 56 and the two gears. Because of the different sizes of the gears, the step motor 56 drives the two lead screws with different speeds. The first optical assembly 60 travels with twice the speed of the second optical assembly 70 in that the first lead screw 53 rotates twice as fast as the second lead screw 54. Therefore, the total optical path remains the same regardless where the scanning point is as discussed above.

What is claimed is:

1. An opto-mechanical apparatus for moving and scanning in an optical system comprising:

a first lead screw having a spiral thread forming a first lead path, said first lead screw having a first gear fastened on one end;

a first optical assembly being carried and led by said first lead screw;

a second lead screw having a spiral thread forming a second lead path, said second lead screw having a second gear fastened on one end, said first and second gears having identical radii and the same number of cogs, and said second lead path being twice as long as said first lead path;

a second optical assembly being carried and led by said second lead screw;

a chassis whereon said first and second lead screws are mounted near a first side of said chassis, said lead screws being mounted along a direction in parallel with the scanning direction of said optical system and said first and second gears being near each other;

a step motor having a rotation axis and cogs formed on the outer surface of said axis, said motor being mounted on said chassis; and a timing belt connecting said rotation axis and said first and second gears, said timing belt having cogs formed on its inner surface;

wherein the cogs of said timing belt, said rotation axis and said gears are all matched for coupling the rotation of said step motor to said first and second gears, and said first optical assembly is moved by said first lead screw twice as fast as said second optical assembly is moved by said second lead screw.

2. The opto-mechanical apparatus for moving and scanning in an optical system according to claim 1, wherein said first optical assembly further comprises a light source, a first reflection mirror, a first lead hole formed near one end of said first optical assembly and a first wheel fastened to an opposite end of said first optical assembly, said first lead hole having a spiral thread formed on its inner surface for matching the spiral thread of said first lead screw; said chassis further comprises a lead track formed on a second side of said chassis in parallel with said first lead screw; and said first optical assembly is carried and moved smoothly by passing said first lead screw through said first lead hole and positioning said first wheel on said lead track.

3. The opto-mechanical apparatus for moving and scanning in an optical system according to claim 1, wherein said second optical assembly further comprises a second reflection mirror, a third reflection mirror, a second lead hole formed near one end of said second optical assembly and a second wheel fastened to an opposite end of said second optical assembly, said second lead hole having a spiral thread formed on its inner surface for matching the spiral thread of said second lead screw; said chassis further comprises a lead track formed on a second side of said chassis in parallel with said second lead screw; and said second optical assembly is carried and moved smoothly by passing said second lead screw through said second lead hole and positioning said second wheel on said lead track.

4. The opto-mechanical apparatus for moving and scanning in an optical system according to claim 1, wherein said first optical assembly further comprises a light source, a first reflection mirror, a first lead hole formed near one end of said first optical assembly and a first wheel fastened to an opposite end of said first optical assembly, said first lead hole having a spiral thread formed on its inner surface for matching the spiral thread of said first lead screw; said second optical assembly further comprises a second reflection mirror, a third reflection mirror, a second lead hole formed near one end of said second optical assembly and a second wheel fastened to an opposite end of said second optical assembly, said second lead hole having a spiral thread formed on its inner surface for matching the spiral thread of said second lead screw; said chassis further comprises a lead track formed on a second side of said chassis in parallel with said lead screws; said first optical assembly is carried and moved smoothly by passing said first lead screw through said first lead hole and positioning said first wheel on said lead track; and said second optical assembly is carried and moved smoothly by passing said second lead screw through said second lead hole and positioning said second wheel on said lead track.

5. The opto-mechanical apparatus for moving and scanning in an optical system according to claim 4, further comprising a focusing lens and an imaging sensor, wherein said light source of said first optical assembly transmits light to scan an object and the light reflected from said object is further reflected and relayed by said first mirror, said second mirror and said third mirror to reach said focusing lens and forms a final image, said focusing lens focusing the final image on said imaging sensor and said imaging sensor converting said final image to output signal.

6. An opto-mechanical apparatus for moving and scanning in an optical system comprising:

a first lead screw having a spiral thread forming a first lead path, said first lead screw having a first gear fastened on one end;

a first optical assembly being carried and led by said first lead screw;

a second lead screw having a spiral thread forming a second lead path, said second lead screw having a second gear fastened on one end, said second gear having a radius twice as large as that of said first gear and a plurality of cogs twice as many as that of said first gear, and said first and second lead paths having identical length;

a second optical assembly being carried and led by said second lead screw;

a chassis whereon said first and second lead screws are mounted near a first side of said chassis, said lead screws being mounted along a direction in parallel with the scanning direction of said optical system and said first and second gears being near each other;

a step motor having a rotation axis and cogs formed on the outer surface of said axis, said motor being mounted on said chassis; and a timing belt connecting said rotation axis and said first and second gears, said timing belt having cogs formed on its inner surface;

wherein the cogs of said timing belt, said rotation axis and said gears are all matched for coupling the rotation of said step motor to said first and second gears, and said first optical assembly is moved by said first lead screw twice as fast as said second optical assembly is moved by said second lead screw.

7. The opto-mechanical apparatus for moving and scanning in an optical system according to claim 6, wherein said first optical assembly further comprises a light source, a first reflection mirror, a first lead hole formed near one end of said first optical assembly and a first wheel fastened to an opposite end of said first optical assembly, said first lead hole having a spiral thread formed on its inner surface for matching the spiral thread of said first lead screw; said chassis further comprises a lead track formed on a second side of said chassis in parallel with said first lead screw; and said first optical assembly is carried and moved smoothly by passing said first lead screw through said first lead hole and positioning said first wheel on said lead track.

8. The opto-mechanical apparatus for moving and scanning in an optical system according to claim 6, wherein said second optical assembly further comprises a second reflection mirror, a third reflection mirror, a second lead hole formed near one end of said second optical assembly and a second wheel fastened to an opposite end of said second optical assembly, said second lead hole having a spiral thread formed on its inner surface for matching the spiral thread of said second lead screw; said chassis further comprises a lead track formed on a second side of said chassis in parallel with said second lead screw; and said second optical assembly is carried and moved smoothly by passing said second lead screw through said second lead hole and positioning said second wheel on said lead track.

9. The opto-mechanical apparatus for moving and scanning in an optical system according to claim 6, wherein said first optical assembly further comprises a light source, a first reflection mirror, a first lead hole formed near one end of said first optical assembly and a first wheel fastened to an opposite end of said first optical assembly, said first lead hole having a spiral thread formed on its inner surface for matching the spiral thread of said first lead screw; said second optical assembly further comprises a second reflection mirror, a third reflection mirror, a second lead hole formed near one end of said second optical assembly and a second wheel fastened to an opposite end of said second optical assembly, said second lead hole having a spiral thread formed on its inner surface for matching the spiral thread of said second lead screw; said chassis further comprises a lead track formed on a second side of said chassis in parallel with said lead screws; said first optical assembly is carried and moved smoothly by passing said first lead screw through said first lead hole and positioning said first wheel on said lead track; and said second optical assembly is carried and moved smoothly by passing said second lead screw through said second lead hole and positioning said second wheel on said lead track.

10. The opto-mechanical apparatus for moving and scanning in an optical system according to claim 9, further comprising a focusing lens and an imaging sensor, wherein said light source of said first optical assembly transmits light to scan an object and the light reflected from said object is further reflected and relayed by said first mirror, said second mirror and said third mirror to reach said focusing lens and forms a final image, said focusing lens focusing the final image on said imaging sensor and said imaging sensor converting said final image to output signal.

* * * * *